(12) United States Patent
DeFore et al.

(10) Patent No.: US 10,353,645 B2
(45) Date of Patent: Jul. 16, 2019

(54) USER INTERFACE FOR A CUSTOMIZED PERSONALIZATION DOCUMENT PRINTER OF AN INSTANT ISSUANCE SYSTEM

(75) Inventors: Daniel Dean DeFore, Chanhassen, MN (US); Scott Robert Hagstrom, Eden Prairie, MN (US); Christophe Biehlmann, Minnetonka, MN (US); Peter William Thorsen, Prior Lake, MN (US)

(73) Assignee: ENTRUST DATACARD CORPORATION, Shakopee, MN (US)

( * ) Notice: Subject to any disclaimer, the term of this patent is extended or adjusted under 35 U.S.C. 154(b) by 1208 days.

(21) Appl. No.: 13/174,912

(22) Filed: Jul. 1, 2011

(65) Prior Publication Data
US 2013/0003104 A1 Jan. 3, 2013

(51) Int. Cl.
*G06F 3/12* (2006.01)
*H04N 1/00* (2006.01)

(52) U.S. Cl.
CPC .......... *G06F 3/1205* (2013.01); *G06F 3/1271* (2013.01); *G06F 3/1288* (2013.01);
(Continued)

(58) Field of Classification Search
CPC ....... G06F 3/127; G06F 3/1288; G06F 3/1205
(Continued)

(56) References Cited

U.S. PATENT DOCUMENTS 5,367,362 A * 11/1994 Forest .................... G03G 15/60
377/8
5,746,451 A 5/1998 Weyer
(Continued)

FOREIGN PATENT DOCUMENTS

JP 2011-043869 3/2003
KR 10-2005-0089116 9/2005
(Continued)

OTHER PUBLICATIONS

International Search Report for international application No. PCT/US2011/043336, dated Jun. 21, 2012 (3 pages).
(Continued)

*Primary Examiner* — Neil R McLean
*Assistant Examiner* — Darryl V Dottin
(74) *Attorney, Agent, or Firm* — Hamre, Schumann, Mueller & Larson, P.C.

(57) ABSTRACT

A remote user interface (RUI) for a personalization document printer of an instant issuance system is provided. The RUI includes a printer functionality component and a server functionality component. The server functionality component is configured to allow, for example a user to control user authentication to use the printer, control print queues of the printer, control print workflows of the printer, control RUI configuration, control remote access to printer user functions and a print preview displaying an image of the customized personalization document with image data and personalization account data, control storage and rendering of data to be placed on a customized personalization document, lock and unlock access to supplies and/or personalization documents in the personalization document printer, access administrative functions, and provide quality assurance functions.

21 Claims, 14 Drawing Sheets

(52) U.S. Cl.
CPC ..... *H04N 1/00233* (2013.01); *H04N 1/00244* (2013.01); *H04N 1/00411* (2013.01); *H04N 1/00424* (2013.01); *H04N 1/00435* (2013.01); *H04N 1/00474* (2013.01); *H04N 1/00477* (2013.01); *H04N 1/00482* (2013.01); *H04N 2201/0082* (2013.01)

(58) Field of Classification Search
USPC .................................................. 358/1.14, 1.15
See application file for complete search history.

(56) References Cited

U.S. PATENT DOCUMENTS

| | | | |
|---|---|---|---|
| 5,863,076 A | 1/1999 | Warther | |
| 5,889,941 A | 3/1999 | Tushie et al. | |
| 6,014,748 A | 1/2000 | Tushie et al. | |
| 6,196,459 B1 | 3/2001 | Goman et al. | |
| 6,363,164 B1* | 3/2002 | Jones et al. | 382/135 |
| 6,997,629 B2* | 2/2006 | Bungert et al. | 400/613 |
| 7,404,516 B2 | 7/2008 | McGee et al. | |
| 7,806,338 B1 | 10/2010 | Behner et al. | |
| 2002/0138438 A1 | 9/2002 | Bardwell | |
| 2003/0002066 A1 | 1/2003 | Miyano | |
| 2003/0006901 A1 | 1/2003 | Kim et al. | |
| 2003/0090712 A1* | 5/2003 | Lenz | G06F 3/1205 358/1.15 |
| 2004/0099730 A1 | 5/2004 | Tuchler et al. | |
| 2004/0188023 A1 | 9/2004 | Sasaki et al. | |
| 2005/0167487 A1 | 8/2005 | Conlon et al. | |
| 2005/0173520 A1 | 8/2005 | Jaros et al. | |
| 2006/0190332 A1 | 8/2006 | Grider | |
| 2006/0232811 A1* | 10/2006 | Yokoyama | G06K 15/005 358/1.14 |
| 2006/0259189 A1 | 11/2006 | Perlow et al. | |
| 2006/0290967 A1* | 12/2006 | Sumitomo et al. | 358/1.14 |
| 2007/0215699 A1 | 9/2007 | Arego et al. | |
| 2009/0219574 A1* | 9/2009 | Cameron | G06Q 20/341 358/1.15 |
| 2009/0222671 A1* | 9/2009 | Burbank | A61B 5/117 713/186 |
| 2011/0000386 A1 | 1/2011 | Behner et al. | |

FOREIGN PATENT DOCUMENTS

| | | |
|---|---|---|
| KR | 10-2008-0009364 | 1/2008 |
| WO | 2005/024699 | 3/2005 |
| WO | 2006/018636 | 2/2006 |

OTHER PUBLICATIONS

Written Opinion for international application No. PCT/US2011/043336, dated Jun. 21, 2012 (4 pages).

* cited by examiner

USER INTERFACE FOR A CUSTOMIZED PERSONALIZATION DOCUMENT PRINTER OF AN INSTANT ISSUANCE SYSTEM

FIELD

This disclosure relates generally to instant issuance systems for the issuance of customizable personalization documents. More particularly, this description relates to a user interface for a personalization document printer of an instant issuance system.

BACKGROUND

Presently, a user can only access and interact with server functionality of an instant issuance system for issuing customized personalization documents via a terminal that may or may not be near a customized personalization document printer of the instant issuance system. Thus, when a user, such as a banker, would like to interact with server functionality, including controlling user authentication, print queues, access to printer user functions, etc., the user must find a terminal connected to the server that may or may not be close to the customized personalization document printer. Also, security concerns may arise as it is difficult for the instant issuance system to determine whether the user providing the print request via the terminal is the same person retrieving the customized personalization document from the customized personalization document printer.

Also, present instant issuance systems require that a server of the instant issuance system transmit both personalized account data and actual rendering data to the customized personalization document printer to initiate a print request. However, actual rendering data can be large as it may contain image data. Sending actual rendering data from the server to the customized personal document printer may require additional network bandwidth for the transmission to be processed and centralizes much of the data used for issuing a customized personalization document at the server of the instant issuance system.

SUMMARY

This application is directed to a user interface for a personalization document printer of an instant issuance system. The user interface allows a user to interact with printer functionality of the personalization document printer and to interact with server functionality associated with a server of the instant issuance system.

That is, the embodiments described herein provide a user interface that allows a user, among other features, to control printer functionality such as, for example, (displaying customized personalization document supply information, printer option settings, progress information for a current or pending print job, a print preview that can display, for example, a front and/or back image of the customized personalization document with image data and personalization account data, etc.) and to control server functionality associated with a server connected to the printer (i.e. controlling: user authentication; print queues; print workflows; remote user interface configuration; remote access to printer user functions and front and back print preview of personalized information on a personalization document, storage and rendering of data to be placed on a personalization document; locking and unlocking access to supplies and/or personalization documents in the personalization document printer; access to administrative functions (e.g., access to sensitive print logs; activity logs; ability to assign the number of authentications per function; ability to reprint personalization documents; quality assurance (QA) functions such as, for example, rejecting a card once it has been printed, reprinting a personalization document, and informing the central server; etc.); etc). All these actions then update the central server in order to track activities, inventory and central reports.

An advantage of these features is additional security within the instant issuance system as users may now be required to authenticate themselves at the customized personalization document printer before the printer will print the customized personalization document. Also, the customized personalization document printer can provide dual authentication to allow a user to control and interact with certain server functionality, as well as any function that is configured to only be accessible by an administrator.

Another advantage of these features is speed and convenience, as the user can control and interact with printer functionality and system functionality, such as unlocking hoppers, gaining access to administration functions, QA functions, etc., directly from the customized personalization document without having to return to the terminal of the instant issuance system that may or may not be close to the printer. Also, these advantages allow print requests to be driven from any workstation (i.e., any terminal or customized personalization document printer).

A further advantage of these features is that an instant issuance system may be implemented at a lower cost, as a terminal of the instant issuance system does not need to be close to the customized personalization document printer.

The embodiments described herein also provide a personalization document printer of an instant issuance system that is capable of storing actual rendering data including image data such as, for example, card templates, logos, fonts, etc. and that is capable of merging the actual rendering data with personalized account data received to render images on a display of the customized personalization document printer of a customized personalization document to be printed. In these embodiments, resources, such as the driver for printing the customized personalization document, are accessed and interacted with directly from the customized personalization document printer as opposed to a terminal that connects to a server that in turn connects to the customized personalization document printer. This allows for greater system scalability (i.e. distributed processing of images) and lower network bandwidth requirements for the instant issuance system, as only personalized account data and rendering instruction data is sent to the customized personalization document printer.

In one embodiment, a remote user interface (RUI) for a customized personalization document printer of an instant issuance system is provided. The RUI includes a printer functionality component that is configured to allow a user to control a display of customized personalization document supply information, control printer option settings, control progress information for a current or pending print job, and control a print preview for displaying an image of the customized personalization document with image data and personalization account data. The RUI also includes a server functionality component that is configured to allow a user to control user authentication to use the printer, control print queues of the printer, control print workflows of the printer, control RUI configuration, control remote access to printer user functions and a print preview displaying an image of the customized personalization document with image data and personalization account data, control storage and rendering of data to be placed on a customized personalization document, lock and unlock access to supplies and/or personalization documents in the personalization document printer, access administrative functions, and provide quality assurance functions.

In another embodiment, a customized personalization document printer for an instant issuance system that allows a customized personalization document for a document holder to be issued while the document holder is present is provided. The printer includes a personalization component that is configured to perform a printing function on a customized personalization document. The printer also includes a network component that is configured to be connected to a server computer of the instant issuance system. Also, the printer includes a memory component that is configured to store a RUI. Further, the printer includes a processor that is configured to run the RUI. Moreover, the printer includes a display and an input device that are configured to allow a user to view and interact with the RUI. The RUI is configured to allow a user to interact with and control printer functionality of the printer and is configured to allow a user to interact with and control server functionality of the server computer.

In yet another embodiment, a system for issuing a customized personalization document for a document holder, while the document holder is present is provided. The system includes a server computer configured to receive a request to issue the customized personalization document for the document holder, wherein the request includes at least one of the document holder's name and background information indicating a background to be placed onto the personalization document, configured to generate personalized account data and rendering instruction data based on information provided in the request, and configured to transmit the personalized account data and the rendering instruction data. The system also includes a customized personalization document printer connected to the server computer via a network, the printer configured to receive the personalized account data and the rendering instruction data, configured to retrieve actual rendering data based on the rendering instruction data, and configured to merge the actual rendering data and the personalized account data into printing data. The printer includes a personalization component that is configured to perform a printing function on a customized personalization document. The printer also includes a network component that is configured to be connected to a server computer of the instant issuance system. Also, the printer includes a memory component that is configured to store a RUI. Further, the printer includes a processor that is configured to run the RUI. Moreover, the printer includes a display and an input device that are configured to allow a user to view and interact with the RUI. The RUI is configured to allow a user to interact with and control printer functionality of the printer and is configured to allow a user to interact with and control server functionality of the server computer.

In yet another embodiment, a method for issuing a customized personalization document for a document holder, while the document holder is present is provided. The method includes receiving, at a customized personalization document printer, personalized account data and rendering instruction data regarding a print request. Also, the method includes retrieving, at the customized personalization document printer, actual rendering data from a memory component of the customized personalization document printer based on the rendering instruction data received from the server computer. The method also includes merging, at the customized personalization document printer, the actual rendering data and the personalized account data to generate printing data. Further, the method includes printing, at the customized personalization document printer, the printing data onto a personalization document to create the customized personalization document while the document holder is present.

DRAWINGS

Figure 4:
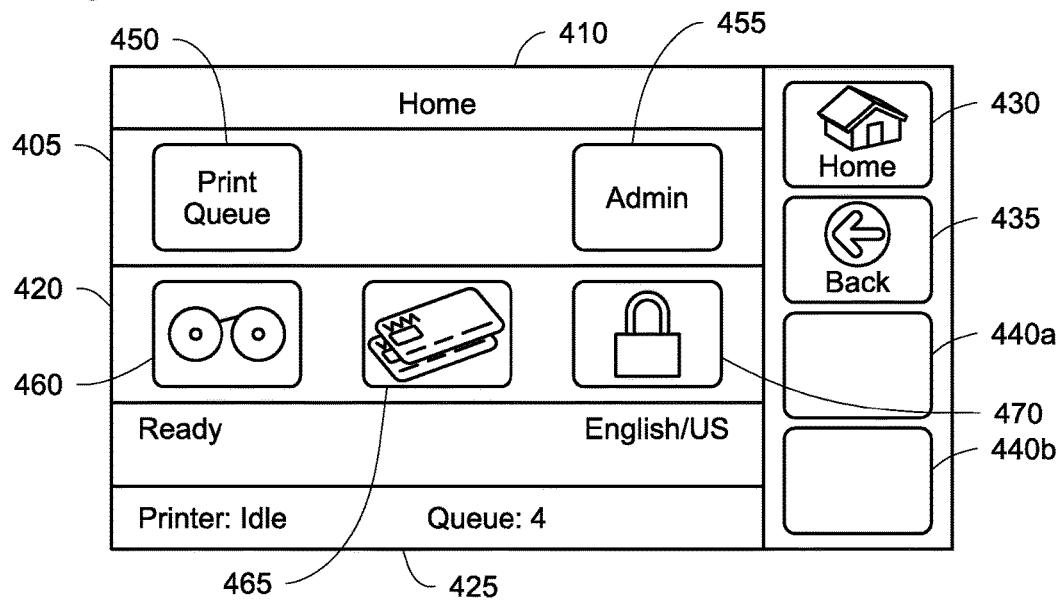
Figure 5:
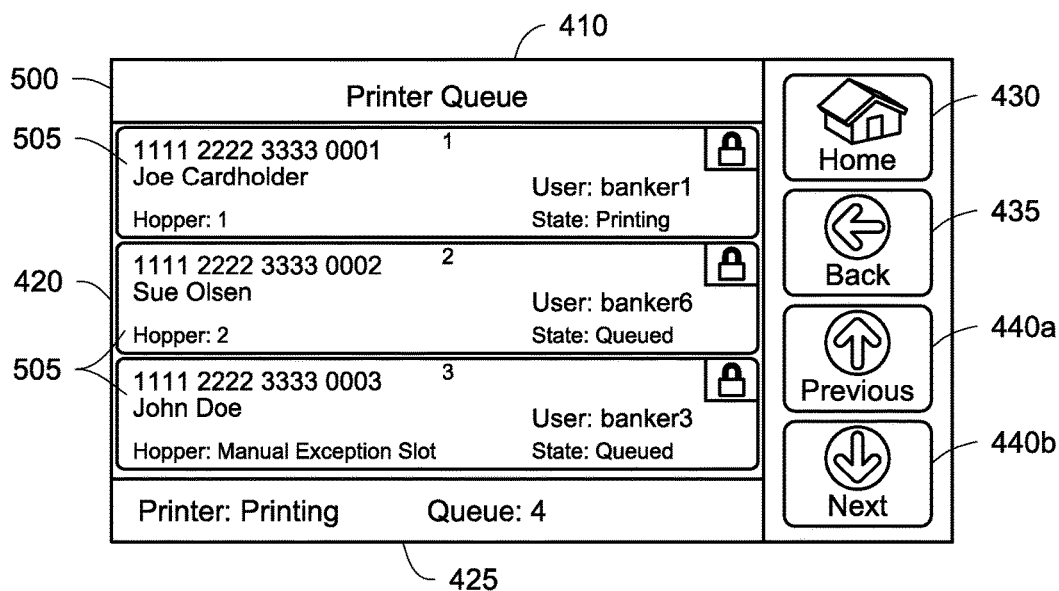
Figure 6:
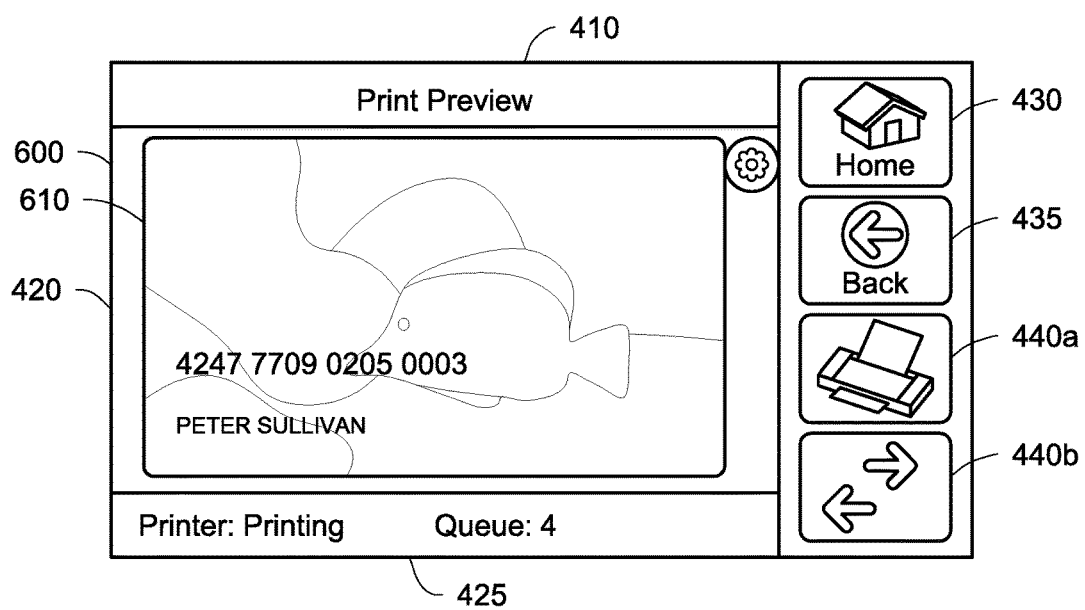
Figure 7:
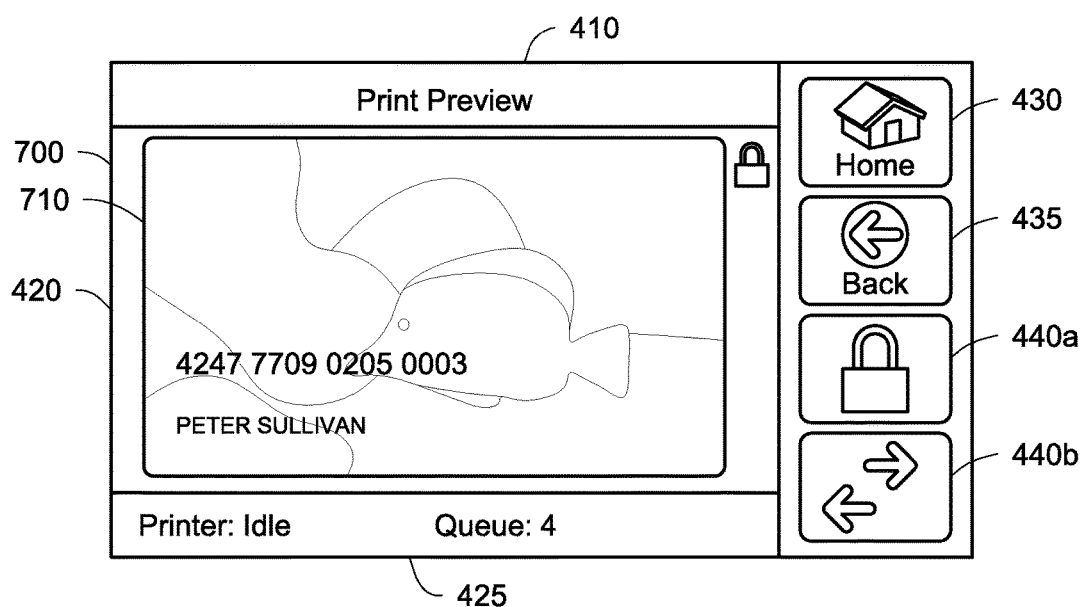
Figure 8:
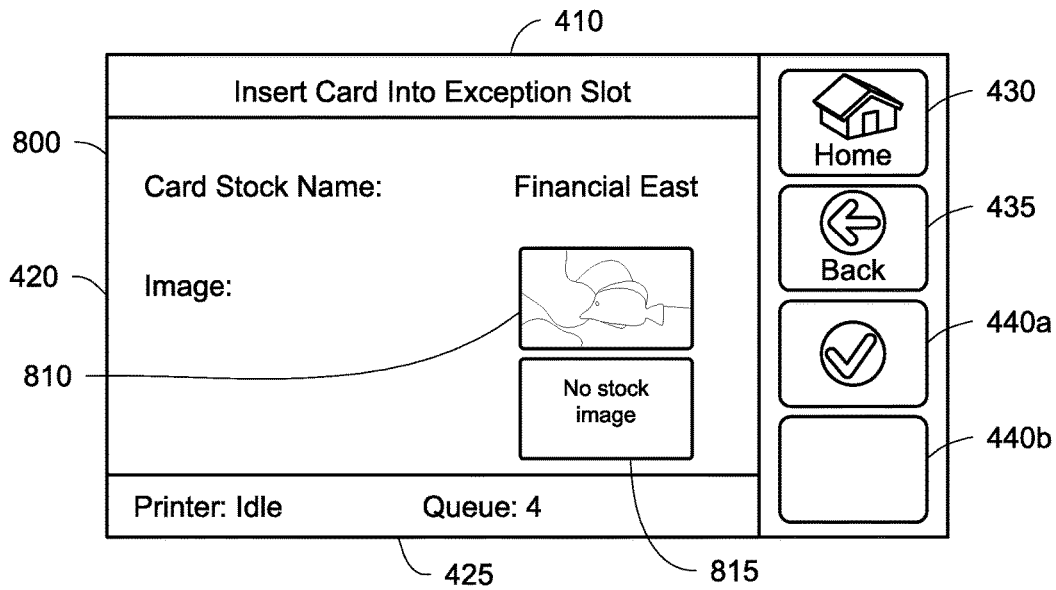
Figure 9:
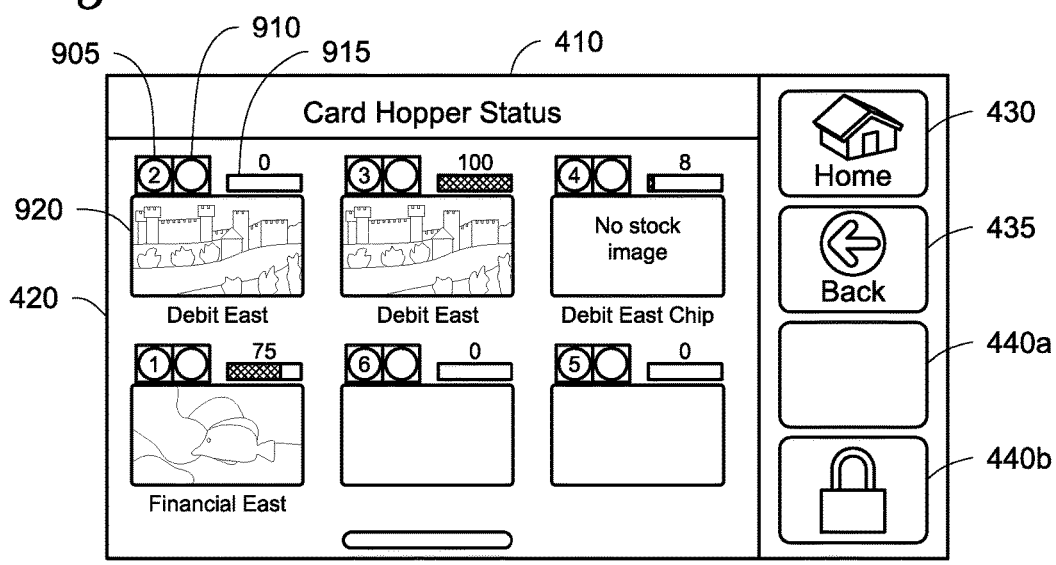
Figure 10:
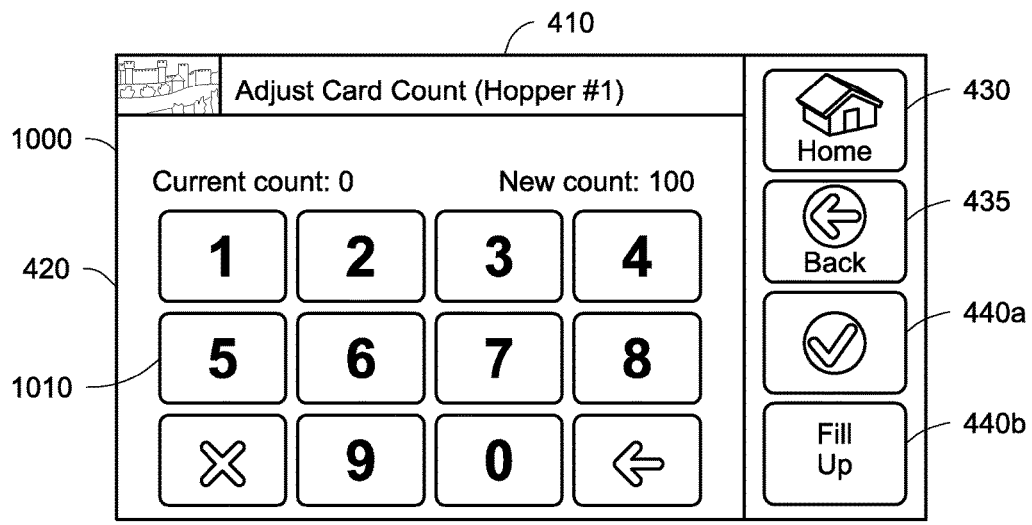
Figure 11:
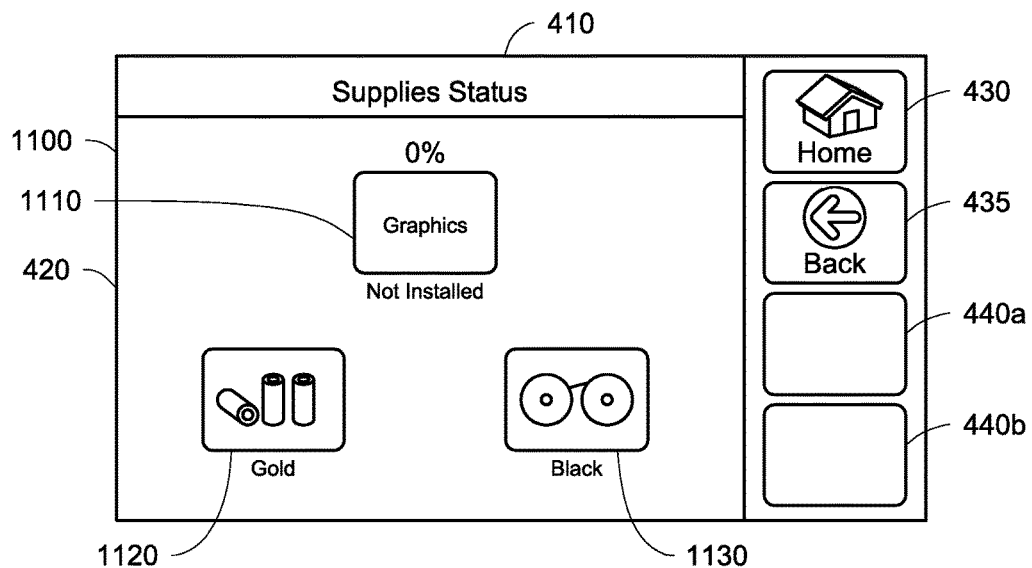
Figure 12:
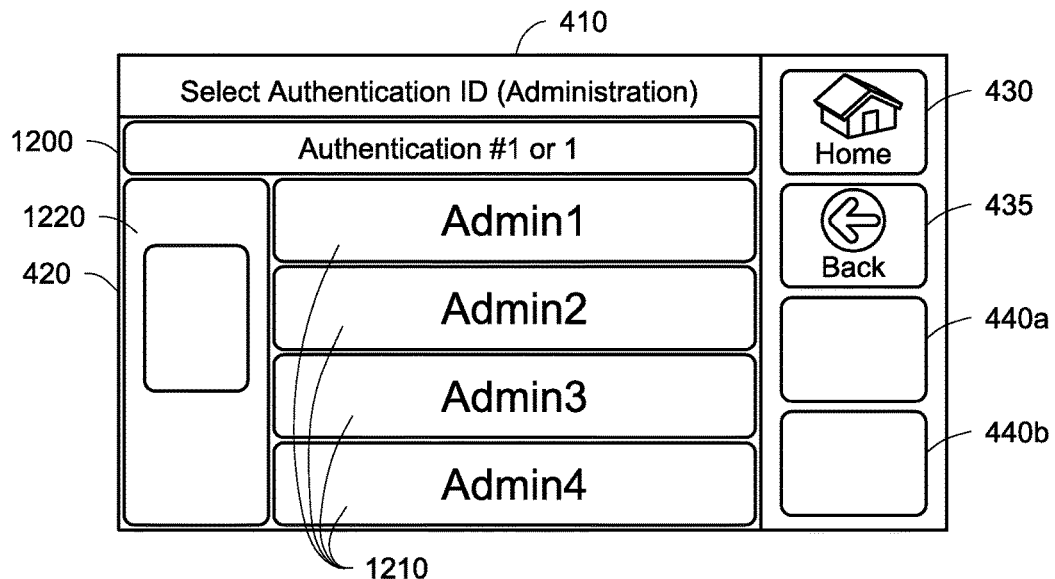
Figure 13:
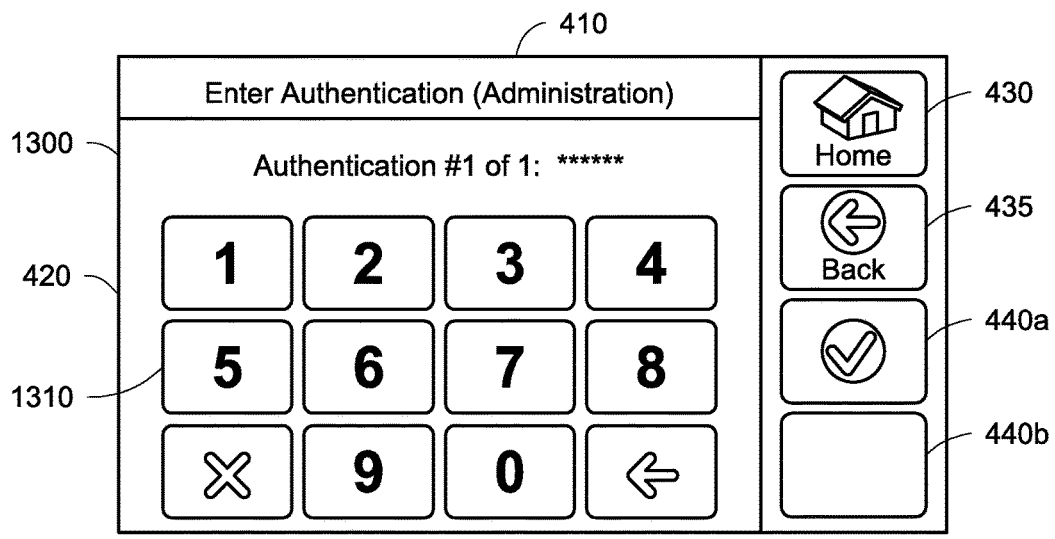
Figure 14:
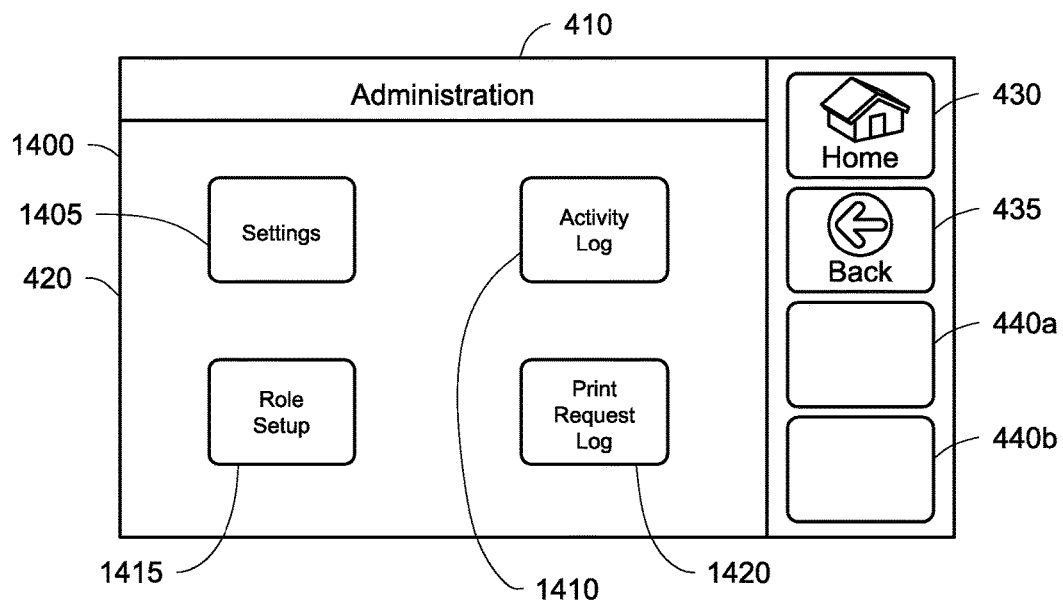
Figure 15:
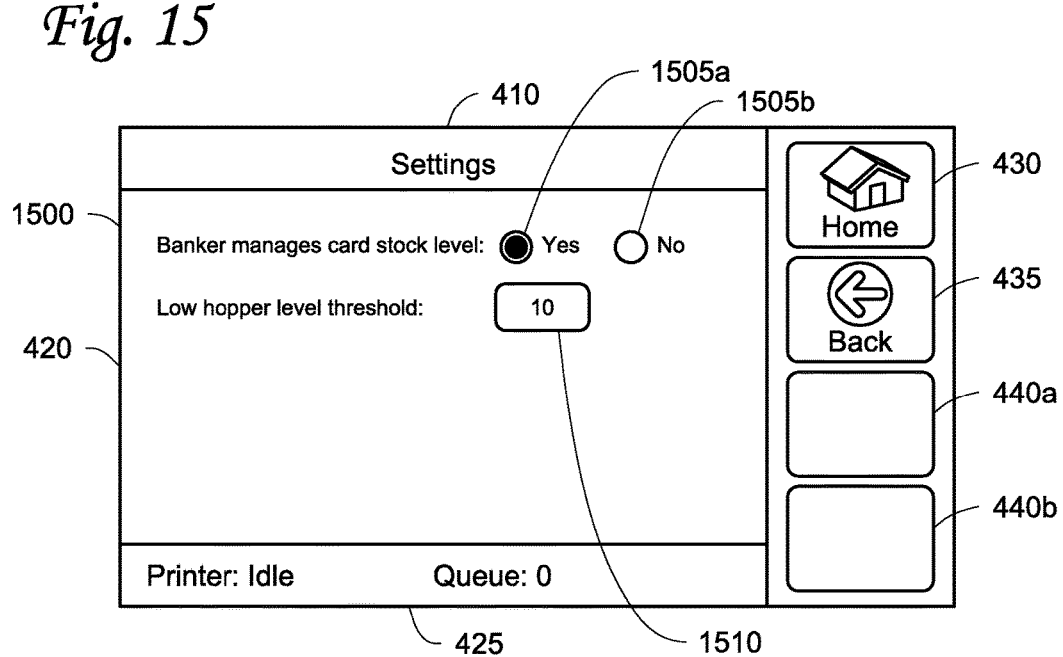
Figure 16:
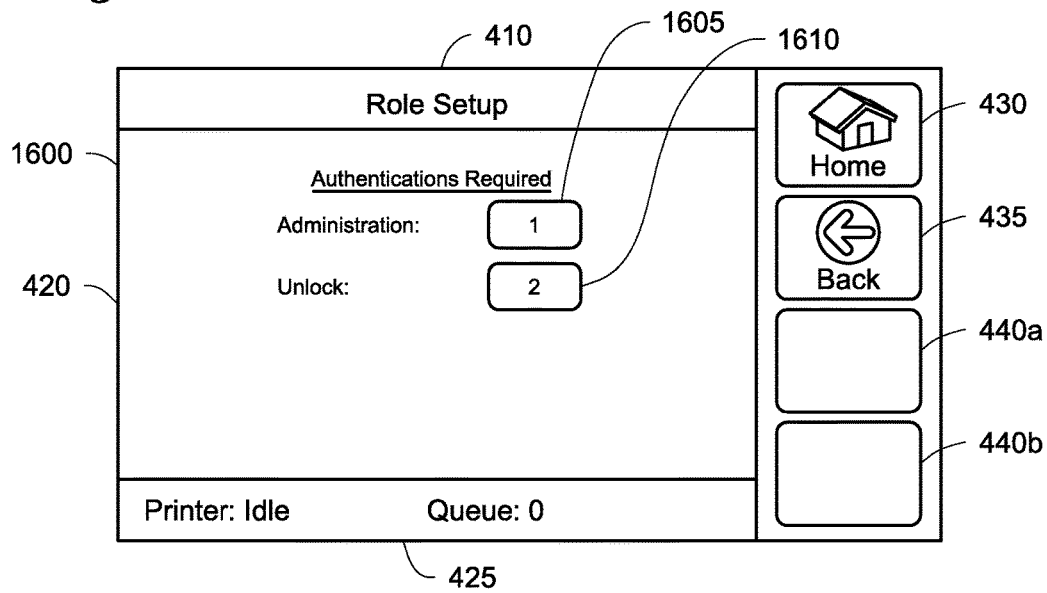
Figure 17:
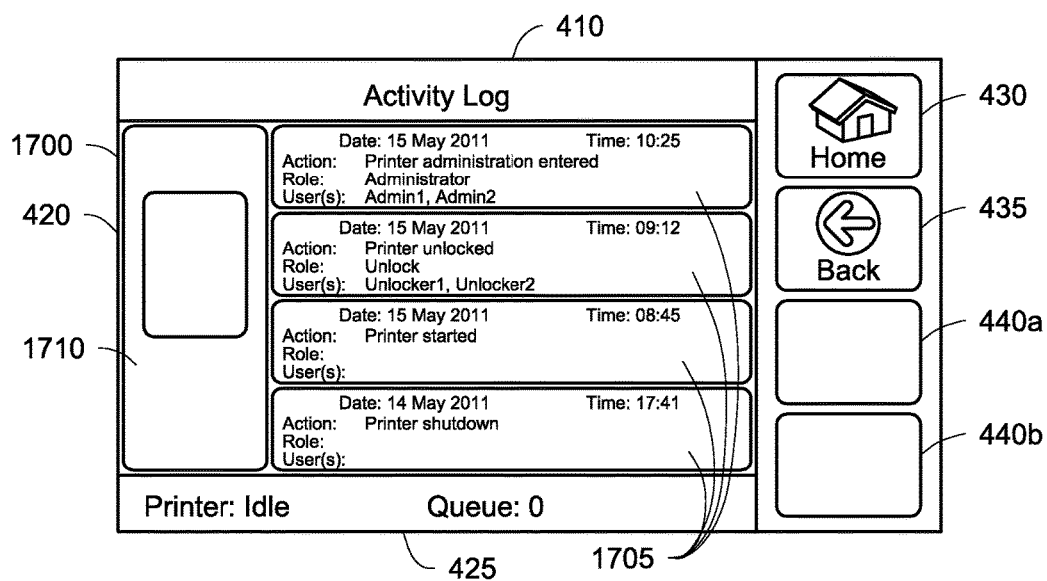
Figure 18:
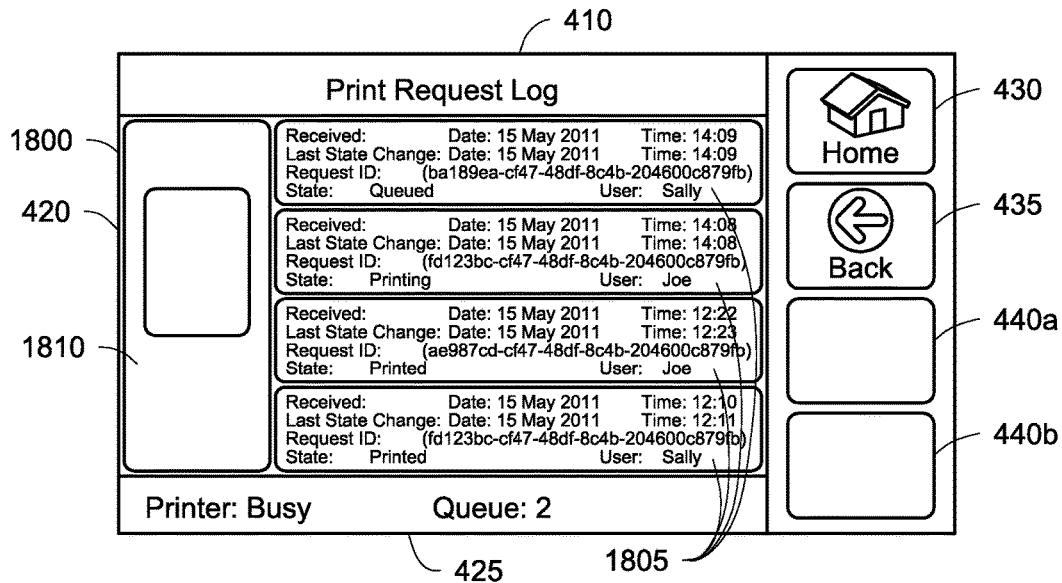

FIG. 4 provides a screenshot of a home screen of a remote user interface according to one embodiment;

FIG. 5 provides a screenshot of a print request queue screen of a remote user interface according to one embodiment;

FIG. 6 provides a screenshot of a print preview screen of a remote user interface according to one embodiment;

FIG. 7 provides a screenshot of a print preview authentication screen of a remote user interface according to one embodiment;

FIG. 8 provides a screenshot of a manual personalization document insertion screen of a remote user interface according to one embodiment;

FIG. 9 provides a screenshot of a hopper status screen of a remote user interface according to one embodiment;

FIG. 10 provides a screenshot of an adjust personalization document count screen of a remote user interface according to one embodiment;

FIG. 11 provides a screenshot of a supplies status screen of a remote user interface according to one embodiment;

FIG. 12 provides a screenshot of an administration identification select screen of a remote user interface according to one embodiment;

FIG. 13 provides a screenshot of an administration authentication screen of a remote user interface according to one embodiment;

FIG. 14 provides a screenshot of an administration screen of a remote user interface according to one embodiment;

FIG. 15 provides a screenshot of a settings screen of a remote user interface according to one embodiment;

FIG. 16 provides a screenshot of a role setup screen of a remote user interface according to one embodiment;

FIG. 17 provides a screenshot of an activity log screen of a remote user interface according to one embodiment;

FIG. 18 provides a screenshot of a print request log screen of a remote user interface according to one embodiment.

Figure 19:
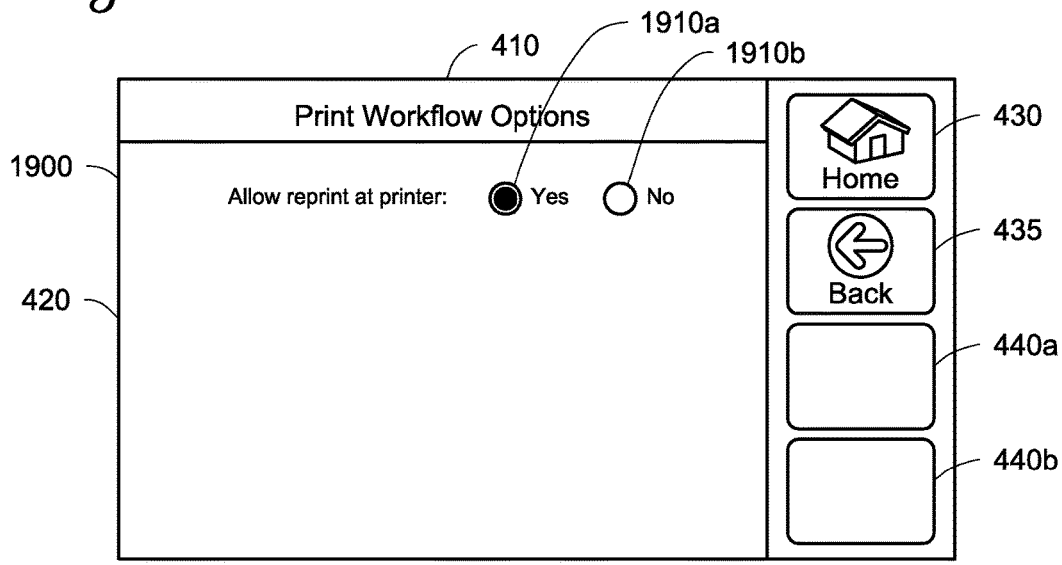

FIG. 19 provides a screenshot of a print workflow options screen of a remote user interface according to one embodiment.

Figure 20:
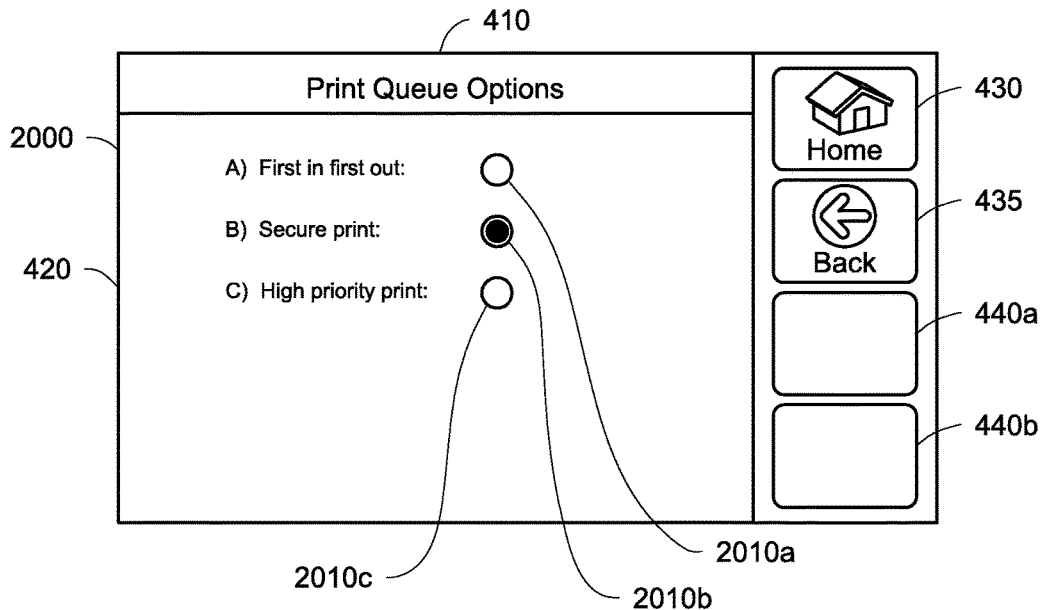

FIG. 20 provides a screenshot of a print queue options screen of a remote user interface according to one embodiment.

Figure 21:
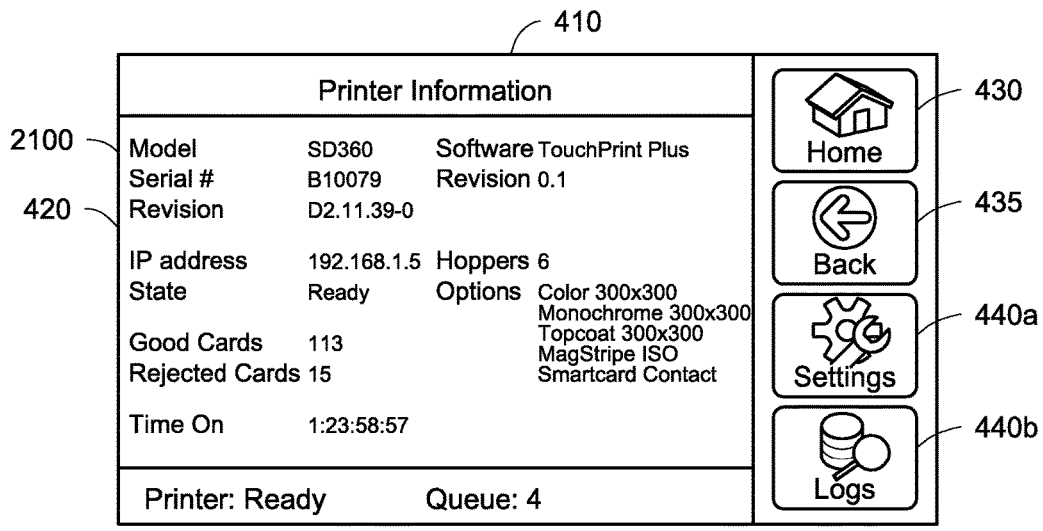

FIG. 21 provides a screenshot of a printer information screen of a remote user interface according to one embodiment.

Figure 22:
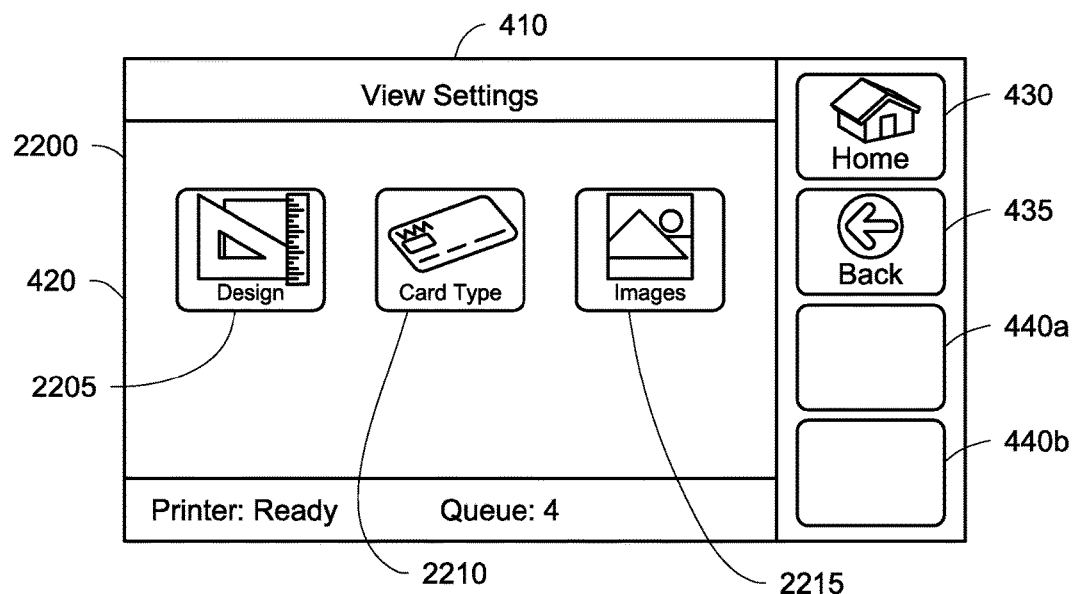

FIG. 22 provides a screenshot of a view settings screen of a remote user interface according to one embodiment.

Figure 23:
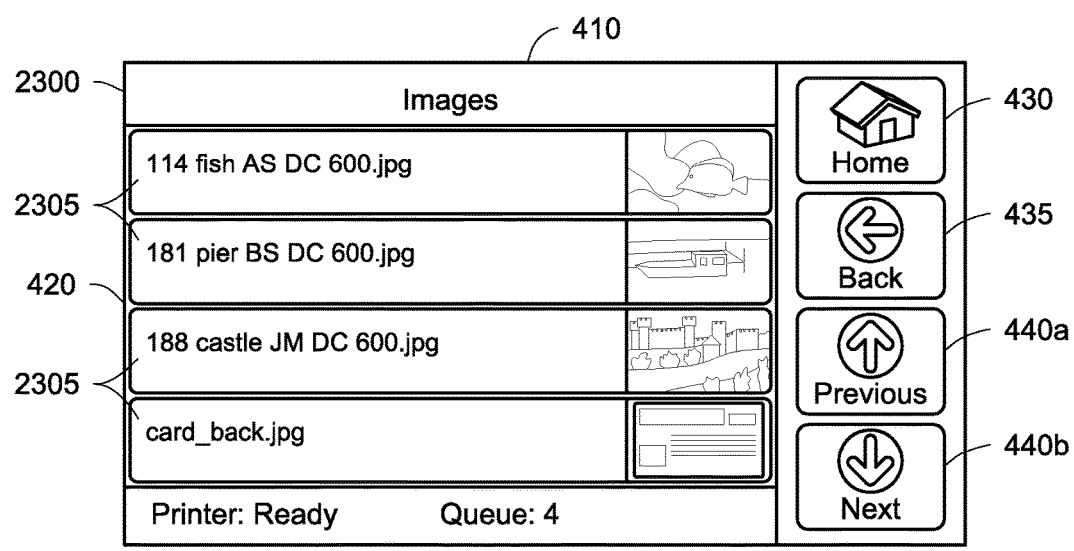

FIG. 23 provides a screenshot of an images screen of a remote user interface according to one embodiment.

Figure 24:
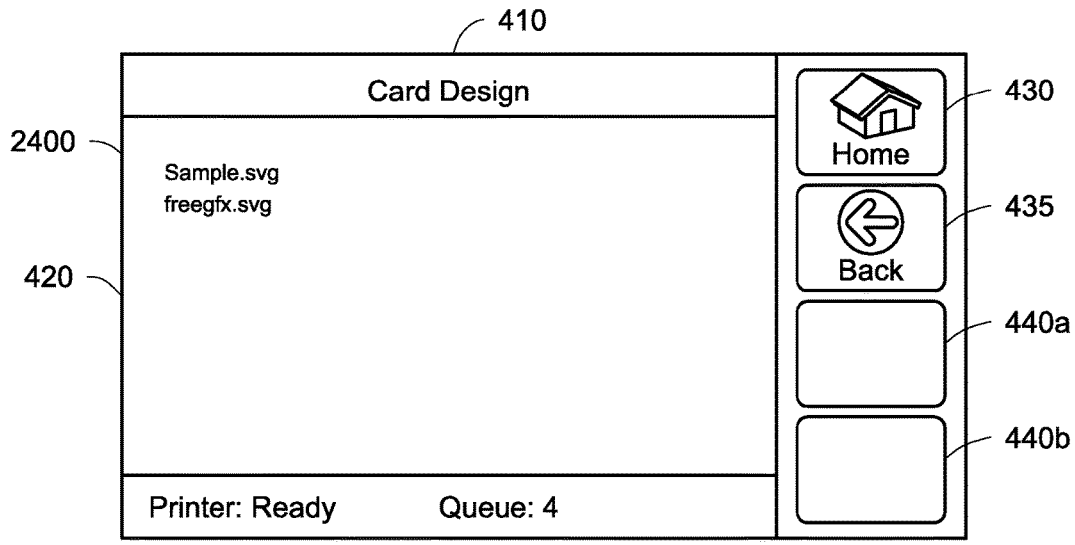

FIG. 24 provides a screenshot of a card design screen of a remote user interface according to one embodiment.

Figure 25:
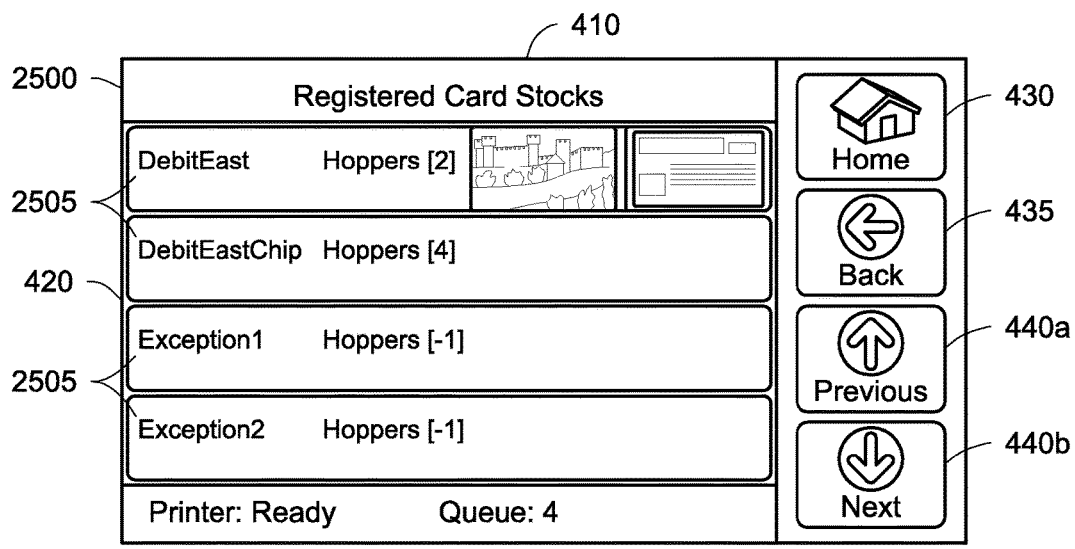

FIG. 25 provides a screenshot of a registered personalization document stocks screen of a remote user interface according to one embodiment.

DETAILED DESCRIPTION

The embodiments provided herein are directed to instant issuance systems for the issuance of customizable personalization documents. Particularly, the embodiments herein provide a user interface for a personalization document printer of an instant issuance system.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination corresponds to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. In addition, a processor(s) may perform the necessary tasks.

One aspect of the invention enables a document holder to receive a customized personalization document from a financial institution while the document holder is present. The document holder may be initializing a new account, or may already have an existing account. The personalization instrument may be customized with a variety of background images. The images may be chosen from an image database, or may be a personal image provided by the document holder.

The personalization document may be printed while the document holder is at, for example, a bank branch location. The document holder or a user on behalf of the document holder enters his/her identification information and background selection into a terminal provided at the branch location. The information is processed and transmitted to a personalization document printer where the document holder receives his/her new customized personalization document.

The personalization document printer may be configured to perform a variety of print functions onto a customized personalization document including, for example, one or more of magnetic encoding, embossing, smart card programming, laser printing, cleaning, and laminating of a customized personalized document. Accordingly, one skilled in the art will understand that the term "print" or "printing" as described herein refers to performing one or more of the above mentioned print functions on a customized personalization document.

Customized personalization documents may include, but are not limited to, cards such as credit cards, debit cards, licenses, personal identification cards, calling cards, etc. and booklets such as passports, among other types of documents.

Figure 1:
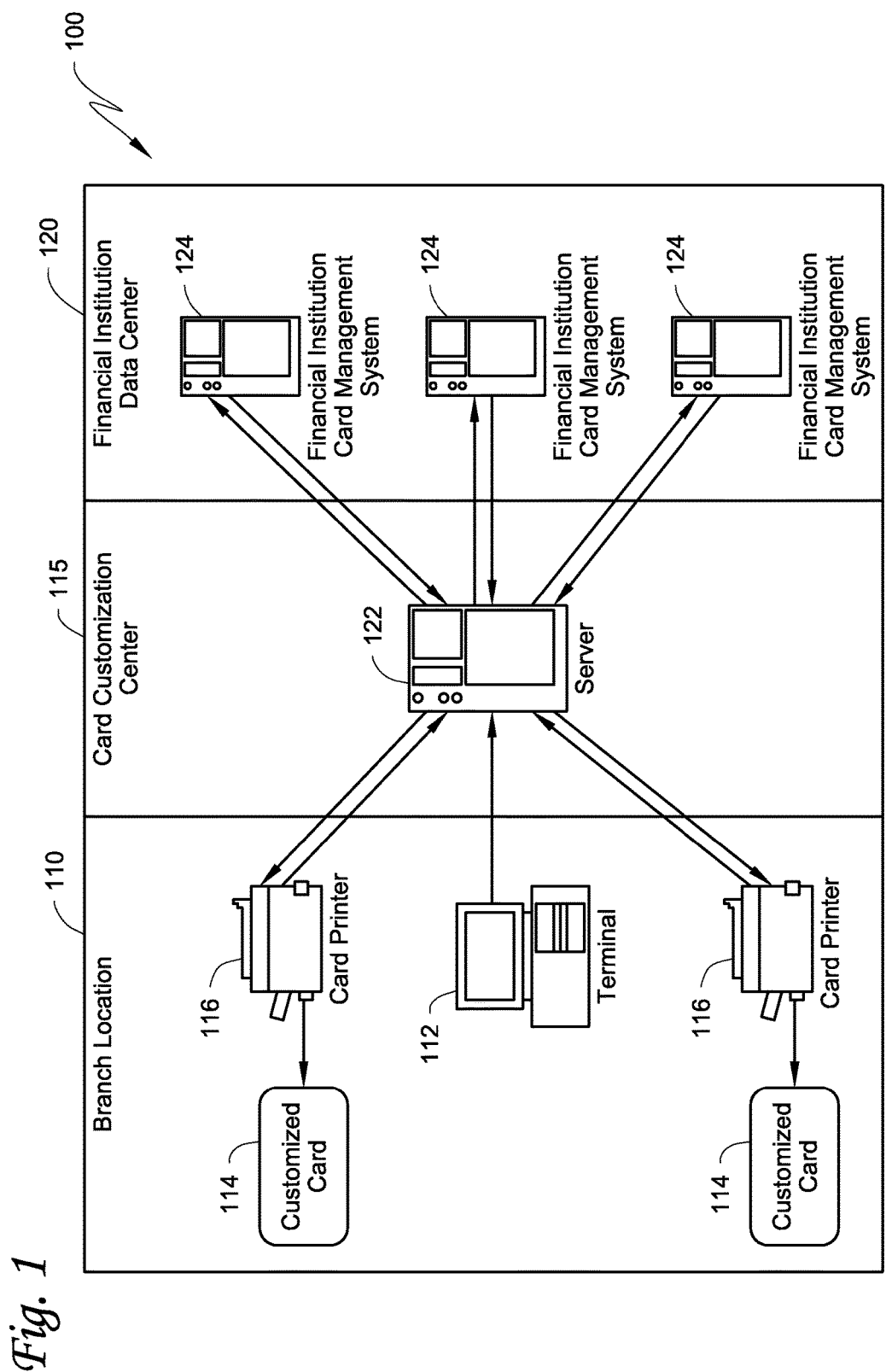
FIG. 1 is a block diagram illustrating an instant issuance system according to one embodiment.

Turning now to FIG. 1, a block diagram of a system 100 for issuing a customized personalization card while a document holder is present is provided. While FIG. 1 is directed to issuing a customized personalization card, in other embodiments, other customized personalization documents may be issued such as, for example, passports.

FIG. 1 may be divided into three locations (i.e. a branch location 110, a card customization center 115 and a financial institution data center 120). The locations are for representative purposes only, and may be physically located together and/or remotely located from each other. Furthermore, there may be more or less than the three representative locations. For example, the server 122 and a financial institution card management system (FICMS) 124 may be at the same location.

The branch location 110 may include a terminal 112 and a plurality of personalization card printers 116. While FIG. 1 shows two card printers 116, in other embodiments, the branch location 110 may include only one card printer 116 or three or more card printers 116 as required. The terminal 112 may display a terminal user interface (TUI) that prompts the document holder to select information that will be placed on the personalization card. In some embodiments, one or more of the personalization card printers 116 may display a remote user interface (RUI) that prompts a user, such as a banker, on behalf of the document holder to select which personalization document in the print queue to be printed and to confirm that the proper image and personalization account data is printed on the personalization card. The information may include the document holder's name and account information (e.g. account number) and the image for the personalization card background. The document holder's name entered in the TUI or RUI may be the name that appears on the personalization instrument. The background image may be selected from a database of approved background images. Images used as a background on a personalization instrument may be required to be approved by the issuing financial institution or an association (e.g. VISA™, MasterCard™, etc.).

In one embodiment, the document holder is able to upload a personal image at the terminal 112 or the card printer 116.

The image may be uploaded in a variety of ways (e.g. flash memory, CD ROM, DVD ROM, floppy disk, secure digital (SD) memory, network connection, etc.). The personal image may be required to be approved by the financial institution and/or a bank representative. The personal image may be scenery, a family member's picture, favorite sports team logo, etc. In some embodiments, the image can come from a server 122.

Once the information from the card holder is input into the terminal 112 or one of the printers 116, the information is transmitted to the server 122. The information may be transmitted over the bank network of the branch location, or over some other network. The network may be a local area network (LAN), a wide area network (WAN), the Internet, etc. The server 122 processes the received information. In one embodiment, the server 122 may be, for example, a CardWizard™ eServer. The processing may include checking the received information for mistakes and inaccuracies. The processing may also include checking the document holder's name and account information against a database to verify the existence of the account. Once the server 122 completes processing the received information, the server 122 transmits the process information to FICMS 124.

In one embodiment, the FICMS 124 generates a personal account number (PAN) and an expiration date of the personalization card. The FICMS 124 may also determine whether a personal image provided by the document holder is approved by the financial institution. The FICMS 124 then transmits the PAN and the expiration date back to the server 122.

Based on the received PAN and expiration date, the server 122 may calculate a card verification value (CVV), a card verification value 2 (CVV2), and a personal identification number (PIN) offset value. The CVV and the PIN offset value may be encoded, for example, on a magnetic stripe of the personalization card. The CVV, the PIN offset value and the CVV2 may be used to verify the authenticity of the personalization instrument. Specifically, the CVV2 may be used by merchants to verify personalization instrument authenticity when the merchant does not have physical access to the personalization instrument (e.g. a purchase made over a telephone, a mail catalog order, the Internet, etc.).

The server 122 transmits personalized account data (i.e., the customer name, the CVV, the CVV2, the PIN offset value, the PAN, the expiration date, etc.) and rendering instruction data to the personalization card printer 116. Rendering instruction data is data that instructs the personalization card printer 116 as to the type of rendering to be performed onto a customized personalization card 114 (i.e., the type of card template, the background image, the type of logos, the type of fonts, etc.). That is, the server 122 does not need to send the actual rendering data (i.e. the card template, the background image, the types of logos, the types of fonts, etc.) to the personalization card printer 116, as the personalization card printer 116 has a memory component (not shown) that stores the actual rendering data.

An advantage of one or more of the personalization card printers 116 storing the actual rendering data is that it allows the system 100 to have greater scalability as the actual rendering data can be distributed amongst other customized printers (not shown) and does not have to be stored in the server 122. Another advantage of having one or more personalization card printer 116 store the actual rendering data is that the network bandwidth requirements for transferring data between the server 122 and the particular personalization card printer 116 is reduced as large actual rendering data, such as image data, does not need to be transferred every time a print request is sent from the server 122 to the personalization card printer 116. In some embodiments, each of the card printers 116 can store different actual rendering data so that different customized cards 114 can be issued by each of the card printers 116. Furthermore, in these embodiments the server 122 is not required to store the different actual rendering data for all of the different renderings that can be printed onto the customized cards 114.

The output from the personalization card printer 116 may be the customized personalization card 114. The customized personalization card 114 may be instantly accessed by the document holder. This enables the document holder to leave the branch location 110 with the customized personalization card 114, as opposed to waiting to receive a customized personalization card in the mail, or returning to the branch location 110 at a future date.

Figure 2:
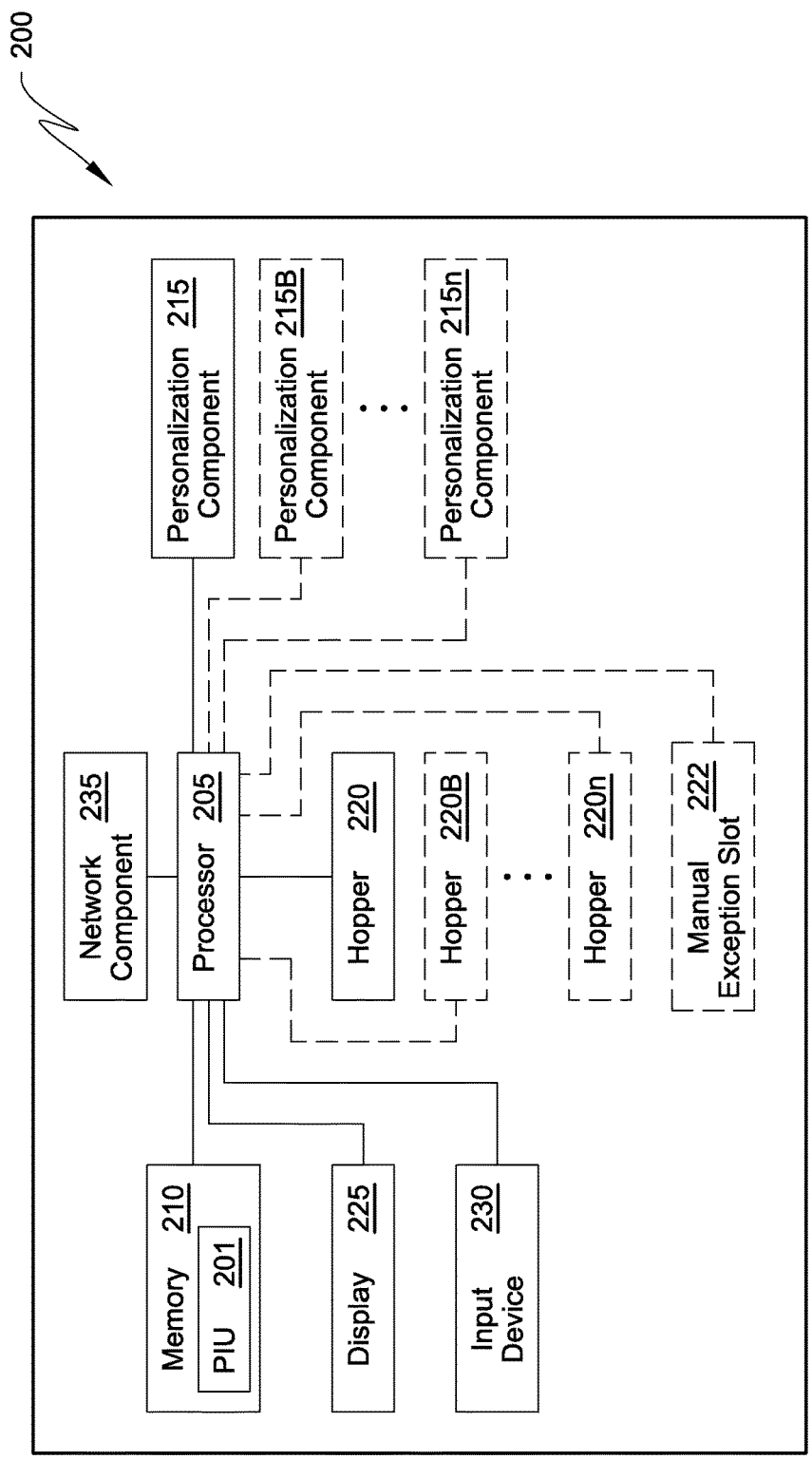
FIG. 2 is a block diagram of one embodiment of a personalization document printer.

FIG. 2 provides a block diagram of one embodiment of a personalization document printer 200. The personalization document printer 200 can be used, for example, as the personalization card printer 116 shown in FIG. 1. The personalization document printer 200 includes a processor 205 electrically coupled to a memory storage component 210, a personalization component 215, a personalization document hopper 220, a display 225, an input device 230 and a network component 235. As shown in FIG. 2, in some embodiments the personalization document printer 200 may include additional personalization document hoppers 220B-220n and also may include a manual exception slot 222. In some embodiments, a plurality of manual exception slots (not shown) is provided in the printer 200. In some embodiments, the personalization document printer 200 may also include additional personalization components 215B-215n. The additional document hoppers 220B-220n and the additional personalization components 215B-215n are also electrically coupled to the processor 205. In one embodiment, the customized personalization printer 200 may be a high definition customized personalization document printer.

Each of the hoppers 220 and 220B-220n is configured to allow multiple types of personalization documents to be loaded into the printer 200 and printed on by one or more of the personalization components 215 and 215B-215n. In some embodiments, a user can manually feed a personalization document, that may not be stored in the hoppers 220 and 220B-220n, into the manual exception slot 222 in order to be customized by the printer 200. Each of the personalization components 215 and 215B-215n provide one or more of the following printing operations on a customized personalization document: magnetic encoding; embossing; smart card programming; cleaning; laminating; etc.

The network component 235 is configured to connect to a server in an instant issuance system such as the server 122 in the system 100 shown in FIG. 1. The network component can be configured to connect to the server via a LAN, WAN, the Internet, etc.

The memory storage component 210 is configured to store, among other data, actual rendering data and personalized account data that may be rendered and stored onto a customized personalization document. The memory component 210 is also configured to store cryptographic keys to authenticate communication between the printer 200 and a server, such as the server 122 in the system 100 shown in FIG. 1. In some embodiments, the memory component 210 is a flash memory storage component.

The display 225 and the input device 230 are configured to allow a user to interact with printer functionality and with server functionality associated with a server connected to the printer 200 via a remote user interface (RUI) 201 that is stored in the memory component 210 and run by the processor 205. Also, in some embodiments, the display 225 and the input device 230 are combined into a touch screen display. This touch screen display may use a liquid crystal display (LCD); however, other types of displays may also be used. Embodiments of the RUI 201 are described in more detail below with respect to FIGS. 4-25.

The user interface allows a user to interact with printer functionality such as, for example, displaying customized personalization document supply information, printer option settings, progress information for a current or pending print job, a print preview that can display, for example, a front and/or back image of the customized personalization document with image data and personalization account data, etc. The user interface also allows a user to interact with server functionality associated with a server connected to the printer 200 which allows a user to, for example, control: user authentication; print queues; print workflows; RUI configuration; remote access to printer user functions and front and back print preview of personalized information on a personalization document; storage and rendering of data to be placed on a customized personalization document; locking and unlocking of hoppers within the printer 200; access to administrative functions; and quality assurance (QA) functions (e.g., rejecting a card once it has been printed, reprinting a personalization document, and informing the central server, etc.); etc. All these actions then update a server (such as the server 122 in the system 100 shown in FIG. 1) in order to track activities, inventory and central reports.

Figure 3:
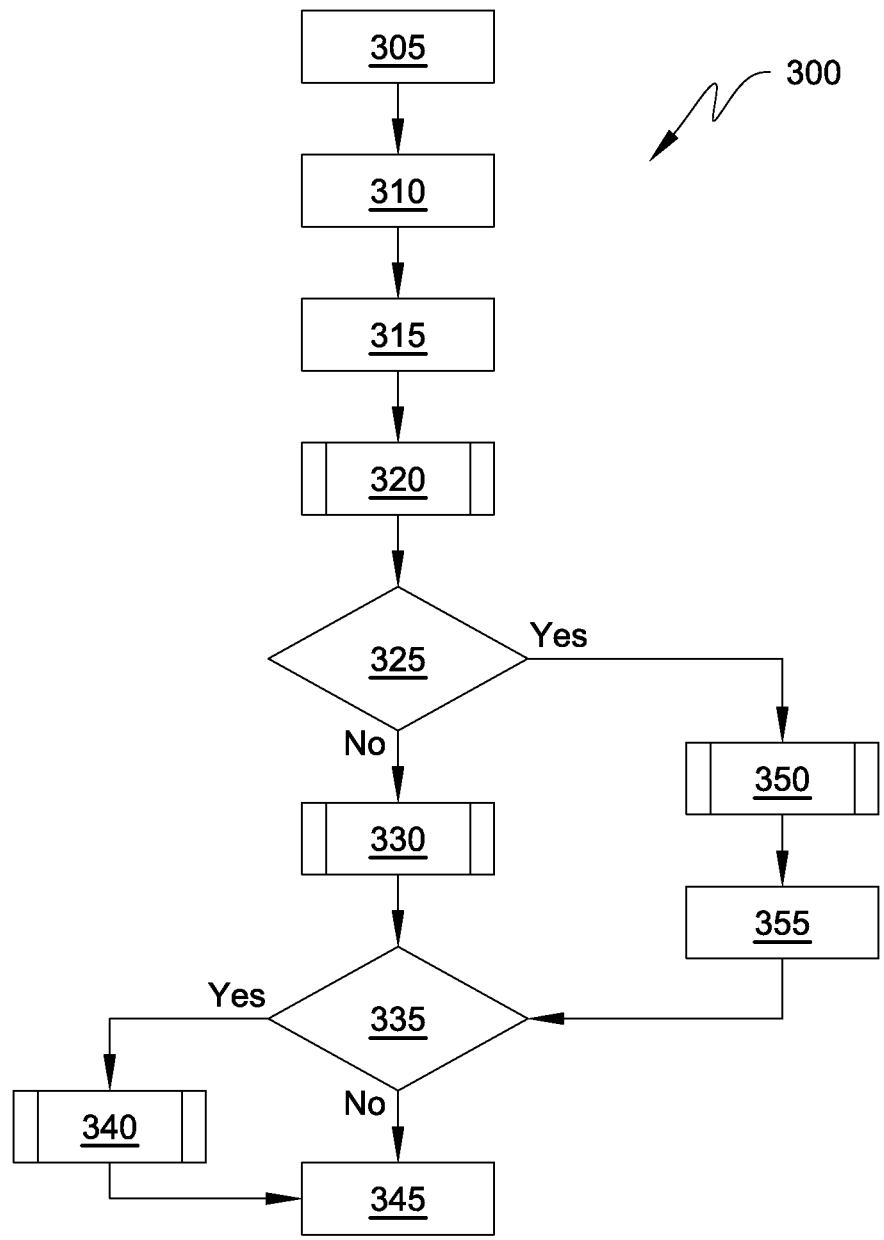
FIG. 3 is a flowchart of a process for instantly issuing a customized personalization document using the customized personalization document printer 200 according to one embodiment.

FIG. 3 provides a flow chart of a process 300 for instantly issuing a customized personalization document using the customized personalization document printer 200 according to one embodiment. The process 300 begins at step 305, where the network component 235 receives personalized account data and rendering instruction data from a server of an instant issuance system (not shown). The process 300 then proceeds to step 310.

At step 310, the processor retrieves actual rendering data from the memory storage component 210 based on the rendering instruction data received by the network component 235. The process then proceeds to step 315.

At step 315, the processor 205 merges the actual rendering data with the personalized account data to generate printing data in the form of a print request that is added to a print queue screen of the RUI (such as print queue screen 500 shown in FIG. 5 and discussed in more detail below) that is displayed to the user on the display 225. The process 300 then proceeds to step 320.

At step 320, the RUI waits for the user to select, via the input device 230, the print request from the print queue screen of the RUI which instructs the printer 200 to begin the process of printing a customized personalization document based on the print request. Once the print request is selected by the user the process 320 proceeds to step 325.

At step 325, the processor 205 determines whether the print request selected by the user at step 320 requires authentication. If the processor 205 determines that the print request does not require authentication the process proceeds to step 330. If the processor 205 determines that the print request selected by the user at step 320 does require authentication, the process proceeds to step 335.

At step 330, the RUI displays a print preview screen (such as print preview screen 600 shown in FIG. 6 and discussed in more detail below) of the RUI and waits for the user to instruct the printer 200 to initiate printing of the customized personalization document. The process 300 then proceeds to step 335.

At step 335, the processor 205 determines whether the print request selected by the user at step 320 requires the user to manually insert a personalization document to be customized into the manual exception slot 222. If the processor 205 determines that the print request requires the user to manually insert a personalization document to be customized into the manual exception slot 222, the process proceeds to step 340. If the processor 205 determines that the print request does not require the user to manually insert a personalization document to be customized into the manual exception slot 222 of the printer 200, the process proceeds to step 345.

At step 340, the RUI displays an insert document screen (such as manual personalization document insertion 800 shown in FIG. 8 and discussed in more detail below) the process 205 waits for a user to insert a personalization document to be customized into the manual exception slot 222 of the printer 200. When the processor 205 determines that the user has inserted a personalization document to be customized into the manual exception slot 222 of the printer 200, the process proceeds to step 345.

At step 345, the processor 205 instructs the one or more personalization components 215, 215B-215n to initiate printing of a customized document personalization document.

At step 350, the process 300, the RUI displays a print preview authentication screen (such as print preview authentication screen 700 shown in FIG. 7 and discussed in more detail below) of the RUI and waits for the user to instruct the processor 205 to begin an authentication process. Once the user has instructed the processor 205 to initiate the authentication process, the process proceeds to step 355.

At step 355, the processor 205 begins the authentication process whereby the user enters an authentication user enters an authentication code into the RUI. In some embodiments, the authentication code is an alpha-numeric authentication code. Once authentication has been successfully accomplished, the process 300 proceeds to step 335.

FIGS. 4-25 provide screenshots of an exemplary RUI 400 presented to a user via the display 225 and interacted with via the input device 230. In the embodiment described below, the display 225 and the input device 230 are combined into a touch screen display for a user to interact with the RUI 400. While FIGS. 4-25 provide one embodiment of the RUI 400, in other embodiments, a user can configure the RUI as needed by, for example, including additional functionality, updating screens of the RUI, reconfiguring what options are displayed on a particular screen, reconfiguring how the RUI responds to different user input, etc.

As shown in FIGS. 4-25, each screen of the RUI 400 includes a header bar 410, a menu bar 415 and a window 420. In some screens of the RUI 400, a footer bar 425 is also included that indicates to the user the printing status of the printer 200 and the number of print requests in the print request queue. The header bar 410 indicates to the user the screen of the RUI 400 being displayed. The menu bar 415 includes a home navigation button 430, a previous screen button 435 and two screen specific buttons 440. The home navigation button 430 allows the user to return to the home screen 405 from any screen of the RUI 400. The previous screen button 435 allows a user to return to the previous screen displayed by the RUI 400. The screen specific buttons 440A and 440B can be configured to perform different functions based on the requirements of the screen being displayed. The window 420 is configured to provide screen specific information and buttons based on the screen being displayed. While FIGS. 4-25 specifically refer to cards, it would be obvious to one skilled in the art that other types of customized personalization documents (e.g., passports) can be controlled and configured using the RUI 400.

FIG. 4 provides a screenshot of a home screen 405 of the RUI 400. The home screen 405 appears upon powering of the printer 200 and when the home navigation button 430 is selected by the user. The window 420 of the home screen 405 includes a print queue button 450, an administration button 455, a supplies status indicator button 460, a document status indicator button 465, and an authentication indicator button 470. The window 420 also displays the status of the printer and the language being used by the RUI 400. The two screen specific buttons 440 in the home screen 405 are not used.

FIG. 5 provides a screenshot of a print request queue screen 500 of the RUI 400. The print request queue screen 500 appears, for example, when the user selects the print queue button 450 at the home screen 405. The window 420 displays unique print request buttons 505. The number of unique print request buttons 505 that are displayed in the window 420 depends on the number of pending print requests. As shown in FIG. 5, when there are multiple pending print requests a plurality of unique print request buttons 505 are displayed. However, if the printer 200 has one print request only a single unique print request button 505 will be displayed and if the printer 200 has zero print requests no print request buttons 505 are displayed. At the print request queue screen 500, the screen specific button 440A displays an upward arrow icon and when selected allows a user to scroll upward through the print request buttons 505. Similarly, the screen specific button 440B displays a downward arrow icon and when selected allows a user to scroll downward through the print request buttons 505.

Each of the unique print request buttons 505 identifies a unique print request generated by the processor 205. Each print request button 505 includes print request information including the account number and the account name to be printed onto the personalization document, hopper information indicating the specific type of personalization document to be customized, the user requesting the specific print request, an authentication indicator indicating whether the user undergo the authentication process in order to initiate printing, and the printing status of the specific print request.

FIG. 6 provides a screenshot of a print preview screen 600 of the RUI 400. The print preview screen 600 appears, for example, when the user selects one of the unique print request buttons 505 that does not require authentication at the print request queue screen 500. The window 420 displays a fully rendered image 610 of how one side of the customized personalization document will appear when the print request is completed. The fully rendered image 610 is generated by the processor 205 by combining personalized account data received from an instant issuance server with actual rendering data retrieved from the memory storage component 210 based on rendering instruction data received by the instant issuance server. At the print preview screen 600, the screen specific button 440A displays a printer icon and when selected instructs the printer 200 to initiate printing of the customized personalization document. The screen specific button 440B displays a refresh/rotate icon and when selected instructs the RUI 400 to display a fully rendered image of how an opposite side of the customized personalization document will appear when the print request is completed (not shown).

FIG. 7 provides a screenshot of a print preview authentication screen 700 of the RUI 400. The print preview authentication screen 700 appears, for example, when the user selects one of the unique print request buttons 505 that requires authentication at the print request queue screen 500. The window 420 displays a fully rendered image 710 of how one side of the customized personalization document will appear when the print request is completed. The fully rendered image 710 is generated by the processor 205 by combining personalized account data received from an instant issuance server with actual rendering data retrieved from the memory storage component 210 based on rendering instruction data received by the instant issuance server. At the print preview screen 700, the screen specific button 440A displays an authentication icon and when selected instructs the processor 205 to initiate the authentication process. The screen specific button 440B displays a refresh/rotate icon and when selected instructs the RUI 400 to display a fully rendered image of how an opposite side of the customized personalization document will appear when the print request is completed (not shown).

FIG. 8 provides a screenshot of a manual personalization document insertion screen 800 of the RUI 400. The manual personalization document insertion authentication screen 800 appears, for example, when the user selects initiation of a print request that requires manual insertion of a personalization document to be customized into the printer 200. The window 420 displays the personalization document stock name of the specific type of personalization document necessary to be inserted by the user and displays a stock image 810 of the specific type of personalization document necessary, if the stock image 810 is stored in the memory storage component 210. If a particular stock image is not stored in the memory storage component 210, a text box 815 that states "no stock image" is displayed. At the manual personalization document insertion screen 800, the screen specific button 440A displays checkmark icon and when selected instructs the processor 205 to initiate the printing process. The screen specific button 440B is not used in the manual personalization document insertion screen 800.

FIG. 9 provides a screenshot of a hopper status screen 900 of the RUI 400. The hopper status screen 900 appears, for example, when the user selects the document status indicator button 465 at the home screen 405. The hopper status screen 900 provides one example of the printer functionality that can be interacted with and controlled via the RUI 400. The window 420 displays details of the personalization document stock supplies loaded into each of the hoppers 220, 220B-220$n$. For each hopper in the printer 200, the hopper status screen 900 displays a hopper identifier 905 for the particular hopper, a supply indicator 910 indicating whether there are personalization documents available to be customized in the particular hopper, a supply amount indicator 915 indicating the exact amount of personalization documents available to be customized in the particular hopper, and an image button 920 that displays a stock image of the personalized document stored in the particular hopper.

In FIG. 9, the hopper identifier 905 uses a numbering system to identify each of the hoppers 220, 220B-220$n$ within the printer 200. If personalization document stock quantities are not tracked/managed by the user, the supply indicator 910 displays a green light if there are one or more personalization documents available in the particular hopper and a red light if there are no personalization documents available in the particular hopper. If personalization document stock quantities are being tracked/managed by the user, the supply indicator 910 displays a green light if there are more than a threshold number of personalization documents available in the particular hopper, a yellow light if there are less than a threshold number of personalization documents available in the particular hopper and a red light if there are no personalization documents available in the particular hopper. In one embodiment, the threshold number of personalization documents is ten. However, the threshold number can be set by the user. For example, in other embodiments, the threshold number of personalization documents can be any integer greater than 1 such as, for example, 2, 5, 20, 100, etc.

If a stock image for a personalization document supplied by a particular hopper is stored in the memory storage component 210, the stock image is displayed in the image button 920. If a stock image for a personalization document supplied by a particular hopper is not stored in the memory storage component 210, a text box that states "no stock image" is displayed in the image button 920.

The screen specific button 440A is not used in the hopper status screen 900. The screen specific button 440B displays an authentication icon and when selected instructs the RUI 400 to send the user to the administration identification (ID) select screen 1200.

FIG. 10 provides a screenshot of an adjust personalization document count screen 1000 of the RUI 400. The adjust personalization document count screen 1000 appears, for example, when the user selects one of the image buttons at the hopper status screen 900. The menu bar 410 provides information known about the particular hopper including the hopper identifier, a stock image of personalized documents stored in the particular hopper if available and the amount of personalized documents stored in the particular hopper. The window 420 provides a numeric keypad 1010 for the user to enter the amount of additional personalized documents to be loaded into the particular hopper. The window 420 also displays the current amount of personalized documents stored in the particular hopper and displays the number of personalized documents selected by the user using the numeric keypad 1010 or the screen specific button 440B (described below). The screen specific button 440A displays a checkmark icon and when selected instructs the RUI 400 to the print request queue screen 500. The screen specific button 440B displays a "Fill Up" icon and when selected instructs the processor 205 that the particular hopper should be filled to the maximum capacity of the particular hopper.

FIG. 11 provides a supplies status screen 1100 of the RUI 400. The supplies status screen 1100 appears, for example, when the user selects the supplies status indicator button 460 at the home screen 405. The supplies status screen 1100 provides another example of the printer functionality that can be interacted with and controlled via the RUI 400. The window 420 displays a graphics ribbon supply indicator 1110, a topping supply indicator 1120 and an indent supply indicator 1130. The graphics ribbon supply indicator 1110 displays a percentage of the remaining graphic ribbon supply that can be determined, for example, by a radio frequency identification (RFID) tag on the graphic ribbon supply. The topping supply indicator 1120 and the indent supply indicator 1130 each display a green light if the topping supply amount or the indent supply amount are more than a threshold amount, a yellow light if the topping supply amount or the indent supply amount are less than a threshold amount and a red light if the topping supply amount or the indent supply amount is zero. The threshold amount for the topping supply amount and the threshold amount for the indent supply amount can be set by the user. The screen specific buttons 440A, B are not used in the supplies status screen 1100.

FIG. 12 provides an administration identification (ID) select screen 1200 of the RUI 400. The administration ID select screen 1200 appears, for example, when the user selects the authentication indicator button 470 at the home screen 405. The window 420 displays unique administration ID buttons 1210. The number of unique administration ID buttons 1210 that are displayed in the window 420 depends on the number of unique administration IDs registered with the printer 200. As shown in FIG. 12, when there are multiple unique administration IDs a plurality of unique administration ID buttons 1210 are displayed. However, if the printer 200 has only one registered unique administration ID only a single unique administration ID button 1210 will be displayed and if the printer 200 has zero registered unique administration IDs no unique administration buttons 505 are displayed. The window 420 also includes a scroll bar 1220 that allows a user to scroll through the unique administration ID buttons 1210. The screen specific buttons 440A, 440B are not used in the administration ID select screen 1200.

FIG. 13 provides an administration authentication screen 1300 of the RUI 400. The administration authentication screen 1300 appears, for example, when the user selects one of the unique administration ID buttons 1210 at the administration ID select screen 1200. The window 420 provides a numeric keypad 1310 that allows the user to enter an authentication password corresponding to the particular unique administration ID selected, for example, at the administration ID select screen 1200. While the window 420 shows a numeric keypad 1310, in other embodiments, the numeric keypad 1310 can be replaced with other types of keypads or authentication inputs such as, for example, an alpha-numeric keypad (not shown). The screen specific button 440A displays a checkmark icon and can be selected by the user to instruct the processor 205 to verify the entered password to authenticate the unique administration ID. The screen specific button 440B is not used in the administration authentication screen 1300.

FIG. 14 provides an administration screen 1400 of the RUI 400. The administration screen 1400 appears, for example, after the processor 205 authenticates the unique administration ID at the administration authentication screen 1400. The administration screen 1400 can also appear, for example, when the user selects the administration button 455 at the home screen 400. The window 420 provides a settings button 1405, an activity log button 1410, a role setup button 1415 and a print request log button 1420. The screen specific buttons 440A, B are not used in the administration screen 1400.

FIG. 15 provides a settings screen 1500 of the RUI 400. The settings screen 1500 appears, for example, after the user selects the settings button 1405 at the administration screen 1400. The window 420 provides document stock level buttons 1505a, b that allow the user to choose whether the banker can manage the document stock level in the printer 200. The window 420 also provides a low hopper level threshold supply setting 1510 that allows the user to enter a low hopper level threshold for a low hopper level threshold supply indicator supply indicator 910 such as the low hopper level threshold supply indicator supply indicator 910. The screen specific buttons 440A, B are not used in the settings screen 1500.

FIG. 16 provides a role setup screen 1600 of the RUI 400. The role setup screen 1600 appears, for example, after the user selects the role setup button 1415 at the administration screen 1400. The window 420 provides an administration setting 1605 that allows the user to choose the number of unique authentications required to access privileged administrative functions (e.g., access to a print log, access to activity logs; access to reprint functions; access to an unlock function, etc.) in the printer 200. The window 420 also provides an unlock setting 1610 that allows the user to choose the number of unique authentications required unlock the printer 200 to allow the user access to load and unload supplies such as ribbons, personalization documents, etc. The screen specific buttons 440A, B are not used in the role setup screen 1600.

FIG. 17 provides an activity log screen 1700 of the RUI 400. The activity log screen 1700 appears, for example, after the user selects the activity log button 1410 at the administration screen 1400. The window 420 displays unique activity log items 1705. The number of unique activity log items 1705 that are displayed in the window 420 depends on the number of activity log items. As shown in FIG. 17, when there are multiple unique activity log items a plurality of unique activity log items 1705 are displayed. However, if the printer 200 has one activity log item only a single unique activity log item 1705 will be displayed and if the printer 200 has zero activity log items no activity log items 1705 are displayed. Each unique activity log item includes: a date and time of the action; a description of the action; the role of the action (i.e. administrator, unlock, etc.); the users who caused the action; and the amount of time the action took place. The window 420 also includes a scroll bar 1710 that allows a user to scroll through the unique activity log items 17050. The screen specific buttons 440A, B are not used in the activity log screen 1700.

FIG. 18 provides a print request log screen 1800 of the RUI 400. The print request log screen 1800 appears, for example, after the user selects the print request log button 1420 at the administration screen 1400. The window 420 displays unique print request log items 1805. The number of print request log items 1805 that are displayed in the window 420 depends on the number of print request log items. As shown in FIG. 18, when there are multiple unique print request log items a plurality of unique print request log items 1805 are displayed. However, if the printer 200 has one print request log item only a single unique print request log item 1805 will be displayed and if the printer 200 has zero print request log items no print request log items 1805 are displayed. Each unique print request log item includes information regarding: the date and time a print request was received; a date and time a last state change occurred; a request ID; a state of the print request; and the user controlling the print request. The window 420 also includes a scroll bar 1810 that allows a user to scroll through the unique print request log items 1805. The screen specific buttons 440A, B are not used in the print request log screen 1700.

FIG. 19 provides a print workflow options screen 1900 of the RUI 400. The window 420 provides reprint buttons 1910a, b that allow the user to choose whether the user can request a reprint of a customized personalization document at the printer 200 using the RUI 400. If the reprint button 1910a is selected, the user can request a reprint of a customized personalization document using the RUI 400. In some embodiments, the RUI 400 may require a second user, such as a supervisor, to authenticate the reprint request. If the reprint button 1910b is selected, the user may be required to perform a new print request process for a customized personalization document at a terminal, such as the terminal 112 in the system 100 shown in FIG. 1. The screen specific buttons 440A, B are not used in the print workflow options screen 1900.

FIG. 20 provides a print queue options screen 2000 of the RUI 400. The window 420 provides print queue option buttons 2010a, b, c that allow the user to choose the print queue process of the printer 200 using the RUI 400. If the print queue option button 2010a is selected, the user can request that the printer 200 performs print requests on a first in first out basis without requiring user authentication at the printer 200 using the RUI 400. If the print queue option button 2010b is selected, the user can request that the printer 200 performs print requests only after a user performs an authentication process at the printer 200 using the RUI 400. If the print queue option button 2010c is selected, the user can request that the printer 200 performs print requests of high priority print requests before performing print requests of low priority print requests. The screen specific buttons 440A, B are not used in the print queue options screen 2000.

FIG. 21 provides a printer information screen 2100 of the RUI 400. The window 420 provides specific printer information of the printer 200 including: model number; serial number; printer revision number; software name; software revision number; IP address; printer state; number of hoppers; printer option settings; number of good personalization documents; number of rejected personalization documents; and the amount of time the printer 200 has been on. The screen specific button 440a displays a settings icon and when selected by the user sends the user to the settings screen 1500 of the RUI 400. The screen specific button 440b displays a logs icon and when selected by the user the RUI 400 sends the user to the activity log screen 1700. In another embodiment, when the user selects the screen specific button 440b, the RUI sends the user to the print request log screen 1800.

FIG. 22 provides a view settings screen 2200 of the RUI 400. The window 420 includes a design button 2205, a personalization document type button 2210 and an images button 2215. When a user selects the design button 2205, the RUI 400 sends the user to a personalization document design screen (such as personalization document design screen 2400 shown in FIG. 24). When a user selects the personalization document type button 2210, the RUI 400 sends the user to, for example, registered personalization document stock screen 2500 shown in FIG. 25. When a user selects the images button 2215, the RUI 400 sends the user to an images screen (such as images screen 2300 shown in FIG. 23). The screen specific buttons 440A, B are not used in the print queue options screen 2000.

FIG. 23 provides an images screen 2300 of the RUI 400. The window 420 includes a plurality of unique image buttons 2305. The number of unique image buttons 2305 that are displayed in the window 420 depends on the number of unique images stored in the printer 200. Each unique image button 2305 displays the name of the image file stored in the printer 200 and displays a picture of the image for the user. As shown in FIG. 23, when there are multiple unique images stored in the printer 200 a plurality of unique image buttons 2305 are displayed. However, if only one image is stored in the printer 200 only a single unique print image button 2305 will be displayed and if no images are stored in the printer 200 no unique image buttons 2305 are displayed. At the images screen 2300, the screen specific button 440A displays an upward arrow icon and when selected allows a user to scroll upward through the unique image buttons 2305. Similarly, the screen specific button 440B displays a downward arrow icon and when selected allows a user to scroll downward through the unique image buttons 2305.

FIG. 24 provides a personalization document design screen 2400 of the RUI 400. The window 420 provides file information regarding a particular personalization document design of personalization documents stored in the printer 200. The screen specific buttons 440A, B are not used in the print queue options screen 2000.

FIG. 25 provides a registered personalization document stock screen 2500 of the RUI 400. The window 420 includes a plurality of unique personalization document stock buttons 2505. The number of unique personalization document stock buttons 2505 that are displayed in the window 420 depends on the number of unique personalization document stocks stored in a hopper or a manual exception slot the printer 200. Each unique personalization document stock button 2505 displays the name of the unique personalization document stock, the hopper storing the stock of the unique personalization document in the printer 200 and, if available, displays a picture of the front and/or back image of the unique personalization document for the user. As shown in FIG. 25, when there are multiple unique personalization document stocks stored in the printer 200 a plurality of unique personalization document stock buttons 2505 are displayed. However, if only one unique personalization document stock is stored in the printer 200 only a single unique personalization document stock button 2505 will be displayed and if no unique personalization document stocks are stored in the printer 200 no unique personalization document stock buttons 2505 are displayed. At the images screen 2300, the screen specific button 440A displays an upward arrow icon and when selected allows a user to scroll upward through the unique personalization document stock buttons 2505. Similarly, the screen specific button 440B displays a downward arrow icon and when selected allows a user to scroll downward through the unique personalization document stock buttons 2505.

The invention may be embodied in other forms without departing from the spirit or essential characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A customized personalization document printer for an instant issuance system that allows a customized personalization document for a document holder to be issued while the document holder is present, the printer comprising:
a personalization component that performs a printing function on a customized personalization document;
a network component that is connectable to a server computer of the instant issuance system, wherein the server computer is separate from and external to the customized personalization document printer;
a memory component that stores a remote user interface (RUI);
a processor that runs the RUI;
a display and an input device that allow a user to view and interact with the RUI,
wherein the RUI allows a user to interact with and control printer functionality of the printer and allows a user to interact with and control server functionality of the server computer including at least one of controlling RUI configuration, and locking and unlocking access to supplies and/or personalization documents in the personalization document printer, wherein the server computer is separate from and external to the customized personalization document printer.

2. The printer of claim 1, wherein the printer functionality includes at least one of: controlling a display of customized personalization document supply information, controlling printer option settings, controlling progress information for a current or pending print job, and a print preview for displaying an image of the customized personalization document with image data and personalization account data.

3. The printer of claim 1, wherein the server functionality also includes one or more of controlling user authentication to use the printer, controlling print queues of the printer, controlling print workflows of the printer, controlling remote access to printer user functions and a print preview displaying an image of the customized personalization document with image data and personalization account data, controlling storage and rendering of data to be placed on a customized personalization document, accessing administrative functions, and providing quality assurance functions.

4. The printer of claim 1, wherein the memory component stores actual rendering data of a customized personalization document.

5. The printer of claim 1, wherein the memory component stores cryptographic keys for authenticating communication between the printer and the server computer.

6. The printer of claim 1, wherein the display and the input device are a touch screen display.

7. The printer of claim 1, further comprising a plurality of personalization components, each of the plurality of personalization components performing a unique printing function on the customized personalization document.

8. The printer of claim 1, further comprising a hopper storing personalization documents to be customized by the printer.

9. The printer of claim 1, further comprising a plurality of hoppers, each of the plurality of hoppers storing a plurality of unique personalization documents.

10. A system for issuing a customized personalization document for a document holder while the document holder is present, the system comprising:
a server computer configured to receive a request to issue the customized personalization document for the document holder, wherein the request includes at least one of the document holder's personalization information and background information indicating a background to be placed onto the personalization document, configured to generate personalized account data and rendering instruction data based on information provided in the request, and configured to transmit the personalized account data and the rendering instruction data;
a customized personalization document printer connected to the server computer via a network, the printer configured to receive the personalized account data and the rendering instruction data, configured to retrieve actual rendering data based on the rendering instruction data, and configured to merge the actual rendering data and the personalized account data into printing data, the printer including:
a personalization component that is configured to perform a printing function on the customized personalization document;
a memory component that is configured to store a remote user interface (RUI);
a processor that is configured to run the RUI;

a display and an input device that are configured to allow a user to view and interact with the RUI, wherein the RUI is configured to allow a user to interact with and control printer functionality of the printer and is configured to allow a user to interact with and control server functionality of the server computer including at least one of controlling RUI configuration, and locking and unlocking access to supplies and/or personalization documents in the personalization document printer.

11. The system of claim 10, wherein the printer functionality includes at least one of: controlling a display of customized personalization document supply information, controlling printer option settings, controlling progress information for a current or pending print job, and a print preview for displaying an image of the customized personalization document with image data and personalization account data.

12. The system of claim 10, wherein the server functionality also includes one or more of controlling user authentication to use the printer, controlling print queues of the printer, controlling print workflows of the printer, controlling remote access to printer user functions and a print preview displaying an image of the customized personalization document with image data and personalization account data, controlling storage and rendering of data to be placed on a customized personalization document, accessing administrative functions, and providing quality assurance functions.

13. The system of claim 10, wherein the memory component is configured to store actual rendering data of a customized personalization document.

14. The system of claim 10, wherein the memory component is configured to store cryptographic keys for authenticating communication between the printer and the server computer.

15. A non-transitory computer readable storage medium of a customized personalization document printer storing one or more programs, the one or more programs comprising instructions, which when executed by a processor of the customized personalization document printer, cause the processor to run a remote user interface (RUI) that allows a user, via a display and an input device of the customized personalization document printer, to control and interact with an instant issuance system, the RUI comprising:

a printer functionality component that allows a user to control a display of customized personalization document supply information, control printer option settings, control progress information for a current or pending print job, and control a print preview for displaying an image of the customized personalization document with image data and personalization account data; and a server functionality component that allows a user to update a server that is separate from and external to the customized personalization document printer so as to control user authentication to use the printer, control print queues of the printer, control print workflows of the printer, control RUI configuration, control remote access to printer user functions and a print preview displaying an image of the customized personalization document with image data and personalization account data, control storage and rendering of data to be placed on a customized personalization document, lock and unlock access to supplies and/or personalization documents in the personalization document printer, access administrative functions, and provide quality assurance functions.

16. The printer of claim 1, wherein the printing function includes at least one of a magnetic encoding function, an embossing function, a smart card programming function, a laser printing function, a cleaning function, and a laminating function.

17. The printer of claim 1, wherein the customized personalization document is at least one of a credit card, a debit card, a license, a personal identification card, a calling card, and a passport.

18. A system for issuing a customized personalization document for a document holder while the document holder is present, the system comprising:

a server computer:
that receives a request to issue the customized personalization document for the document holder, wherein the request includes at least one of the document holder's personalization information and background information indicating a background to be placed onto the personalization document,
that generates personalized account data and rendering instruction data based on information provided in the request, and
that transmits the personalized account data and the rendering instruction data;

a customized personalization document printer connected to the server computer via a network, the printer receives the personalized account data and the rendering instruction data, retrieves actual rendering data based on the rendering instruction data, and merges the actual rendering data and the personalized account data into printing data, the printer including:
a personalization component that performs a printing function on the customized personalization document;
a memory component that stores a remote user interface (RUI);
a processor that runs the RUI;
a display and an input device that allow a user to view and interact with the RUI,
wherein the RUI allows a user to interact with and control printer functionality of the printer and allow a user to interact with and control server functionality of the server computer including at least one of controlling RUI configuration, and locking and unlocking access to supplies and/or personalization documents in the personalization document printer,
wherein the server computer is separate from and external to the customized personalization document printer.

19. The system of claim 10, wherein the server computer is connected to the customized personalization document printer via at least one of a local area network (LAN), a wide area network (WAN), and the Internet.

20. The system of claim 10, further comprising:
a second customized personalization document printer connected to the server computer,
wherein the second customized personalization document printer is separate from and external to the server computer and is separate from and external to the customized personalization document printer.

21. The system of claim 10, further comprising:
a financial institution card management system (FICMS) connected to the server computer, wherein the FICMS is separate from and external to the customized personalization document printer and is separate from and external to the server computer.

* * * * *